United States Patent
Dalmia

(10) Patent No.: US 10,637,993 B1
(45) Date of Patent: Apr. 28, 2020

(54) HIGH-BANDWIDTH HOME NETWORK OVER PHONE LINE

(71) Applicant: Aquantia Corporation, San Jose, CA (US)

(72) Inventor: Kamal Dalmia, Fremont, CA (US)

(73) Assignee: Aquantia Corp., Milpitas, CA (US)

( * ) Notice: Subject to any disclaimer, the term of this patent is extended or adjusted under 35 U.S.C. 154(b) by 10 days.

(21) Appl. No.: 15/276,259

(22) Filed: Sep. 26, 2016

(51) Int. Cl.
*H04M 1/00* (2006.01)
*H04M 7/00* (2006.01)
*H04W 88/16* (2009.01)
*H04L 12/66* (2006.01)

(52) U.S. Cl.
CPC .......... *H04M 7/0069* (2013.01); *H04L 12/66* (2013.01); *H04M 7/0081* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 5,169,346 A * | 12/1992 | Johnston | ................. | H01R 13/33 439/676 |
| 5,423,697 A * | 6/1995 | MacGregor | ........... | G06F 1/1616 361/679.4 |
| 5,907,553 A * | 5/1999 | Kelly | ...................... | H04L 12/10 370/433 |
| 6,067,583 A * | 5/2000 | Gilbert | ...................... | H04B 1/38 455/1 |
| 7,408,923 B1 * | 8/2008 | Khan | ...................... | H04L 12/66 370/352 |
| 7,979,587 B1 * | 7/2011 | Lo | ...................... | H04L 12/40136 709/233 |
| 8,320,411 B1 * | 11/2012 | Sedarat | ............... | H04W 52/365 370/241 |
| 8,659,986 B1 * | 2/2014 | Martinson | ............. | H04J 3/0697 370/201 |
| 2002/0150107 A1 * | 10/2002 | Aronson | ............. | H04L 12/4625 370/395.53 |
| 2003/0002108 A1 * | 1/2003 | Ames | ................. | H04B 10/6932 398/139 |
| 2004/0017902 A1 * | 1/2004 | Oksman | .................. | H04L 12/66 379/93.28 |
| 2004/0105432 A1 * | 6/2004 | Yamaji | ................ | H04M 7/0069 370/352 |
| 2004/0136384 A1 * | 7/2004 | Cho | .................... | H04L 12/4625 370/401 |

(Continued)

*Primary Examiner* — Bunjob Jaroenchonwanit
(74) *Attorney, Agent, or Firm* — Lance Kreisman; Peninsula Patent Group

(57) ABSTRACT

An Ethernet networking system is disclosed. The system includes a first network device having an interface to receive Ethernet data from a first Ethernet source. An Ethernet media converter couples the network device to telephone wires. The Ethernet media converter includes a first Ethernet transceiver PHY integrated circuit (IC) having a first system-side interface for coupling to a first transmission media including multiple pairs of wires and a first line-side interface. The Ethernet media converter further includes a second Ethernet transceiver PHY IC having a second line-side interface connected to the first line-side interface, and a second system-side interface for coupling to the telephone wires.

12 Claims, 9 Drawing Sheets

(56) References Cited

U.S. PATENT DOCUMENTS

| | | | |
|---|---|---|---|
| 2005/0186854 A1* | 8/2005 | Huang | H01R 31/06 439/677 |
| 2006/0210053 A1* | 9/2006 | Chang | H04L 12/40 379/332 |
| 2006/0221938 A1* | 10/2006 | Lin | H04L 29/06027 370/352 |
| 2007/0041314 A1* | 2/2007 | Levi | H04L 5/1438 370/216 |
| 2009/0282277 A1* | 11/2009 | Sedarat | G06F 1/3209 713/320 |
| 2010/0054315 A1* | 3/2010 | Huang | H04B 3/23 375/222 |
| 2010/0122122 A1* | 5/2010 | Huang | H04L 67/141 714/48 |
| 2010/0183006 A1* | 7/2010 | Iwai | H04L 12/10 370/389 |
| 2011/0270568 A1* | 11/2011 | Hirai | F01N 3/2026 702/133 |
| 2012/0002666 A1* | 1/2012 | Miller, III | H04L 12/40032 370/352 |
| 2013/0286864 A1* | 10/2013 | Karam | H04L 41/5067 370/252 |
| 2014/0126742 A1* | 5/2014 | Eggebraaten | H04R 3/12 381/80 |
| 2014/0169228 A1* | 6/2014 | Gregory | H04M 3/38 370/259 |
| 2015/0016319 A1* | 1/2015 | Powell | H04L 12/413 370/282 |
| 2015/0341284 A1* | 11/2015 | Kang | H04L 47/805 455/513 |

\* cited by examiner

FIG. 5

RJ45
- 1 – Pair A
- 2 – Pair A
- 3 – Pair B
- 4 – Pair C
- 5 – Pair C
- 6 – Pair B
- 7 – Pair D
- 8 – Pair D RJ11/14
- 1 –
- 2 – Pair B
- 3 – Pair A
- 4 – Pair A
- 5 – Pair B
- 6 –

FIG. 6 (Autoneg w/ Pairs Detection)

US 10,637,993 B1

HIGH-BANDWIDTH HOME NETWORK OVER PHONE LINE

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use the existing Ethernet infrastructure in the enterprise environment for data rates above 1 Gbps and up to 5 Gbps and beyond. Using cabling such as CAT5e at higher rates poses challenges, especially when affected by alien crosstalk.

Most homes are constructed to include common phone line that interconnects various rooms in the house with a central hub. The common phone line generally includes at least two pairs of wires for routing telephone signals. Home phone wiring presents a very noisy environment for high-speed signaling.

However, in some situations, it would be desirable to interface a home Ethernet network with existing home telephone wiring.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 5 illustrates pin mappings relating to the adapter of FIG. 3.

DETAILED DESCRIPTION

Methods and apparatus for Ethernet networks are disclosed. In one embodiment, an Ethernet networking system is disclosed. The system includes a first network device having an interface to receive Ethernet data from a first Ethernet source. An Ethernet media converter couples the network device to telephone wires. The Ethernet media converter includes a first Ethernet transceiver PHY integrated circuit (IC) having a first system-side interface for coupling to a first transmission media including multiple pairs of wires and a first line-side interface. The Ethernet media converter further includes a second Ethernet transceiver PHY IC having a second line-side interface connected to the first line-side interface, and a second system-side interface for coupling to the telephone wires.

Figure 1:
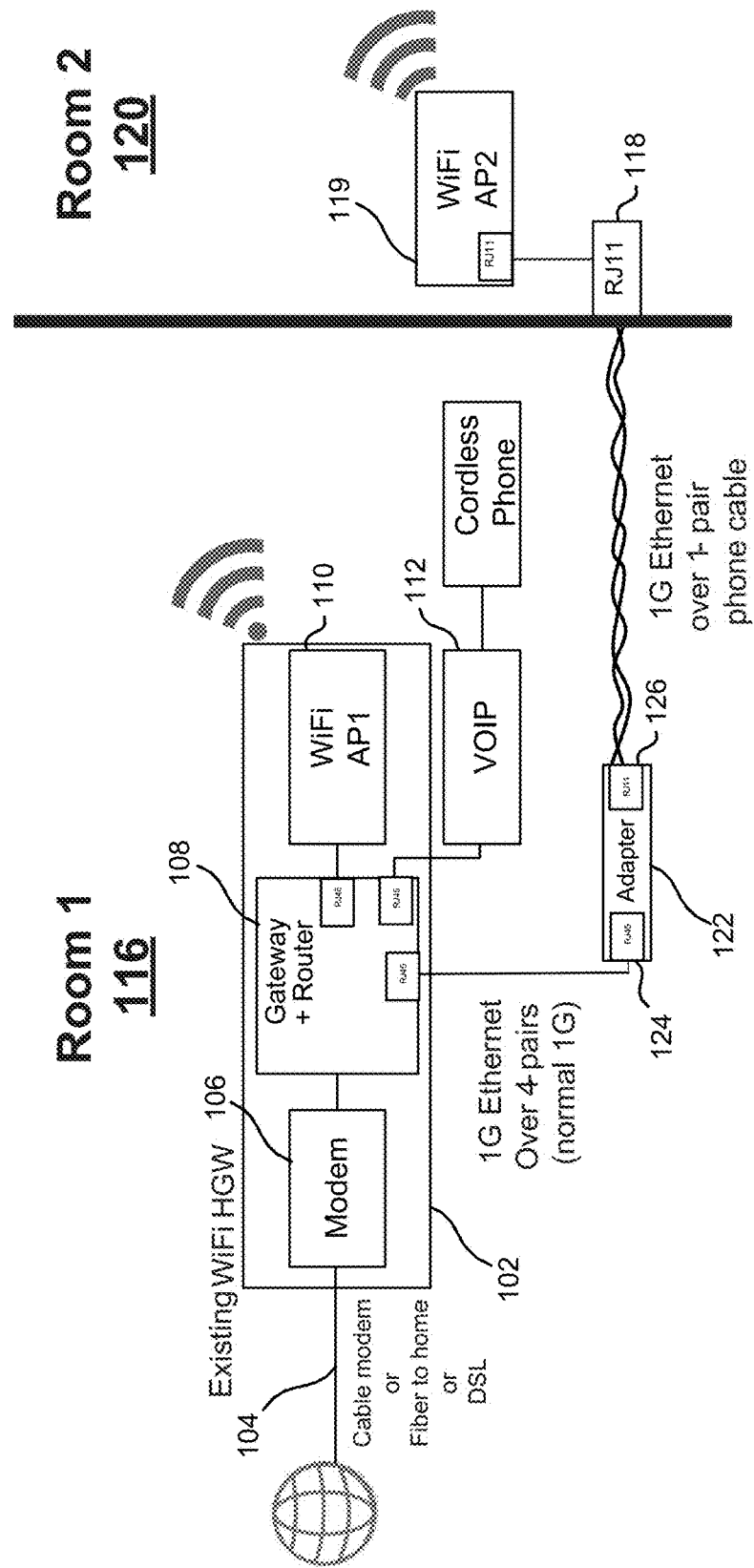
FIG. 1 illustrates one embodiment for a home network that supplies Ethernet over telephone line.

Referring now to FIG. 1, one embodiment for a home network, generally designated 100, includes a home gateway 102 that interfaces with an externally-accessible wide area network (WAN) such as the Internet, via an externally supplied media such as cable, fiber or telephone line 104. The home gateway 102 includes a modem 106 to interface with the external media and a gateway router 108. The gateway router 108 provides a hub function, enabling network access from a centralized access point to a variety of networking data stream interfaces including a WiFi access point 110, and a voice-over-internet protocol (VOIP) interface 112.

The home gateway 102 generally provides adequate network access to a given room within the home. However, if positioned in a constrained location, such as a first room 116, the WiFi converage offered by the WiFi access point 110 may be poor. Thus, the embodiment illustrated in FIG. 1 takes advantage of existing telephone line previously installed in the home to provide a direct Ethernet connection from the gateway router 108 to a port, at 118, located in a second room 120 remote from the first room 116. A second WiFi access point 119 may then take advantage of the port 118 to generate an enhanced WiFi coverage zone in the second room 120.

For one embodiment, the direct Ethernet connection is provided via an Ethernet-over-phone-line adapter 122 that serves as an Ethernet media converter. The adapter 122 generally includes a multi-pair interface 124 that couples to multiple twisted-pair cables consistent with a high-speed Ethernet protocol of, for example 1 Gbps, and a reduced-pair interface 126 that couples to one or two pairs of phone wires. Circuitry in the adapter 122 maps the pins of the various interfaces to allow for communication therebetween.

Figure 2:
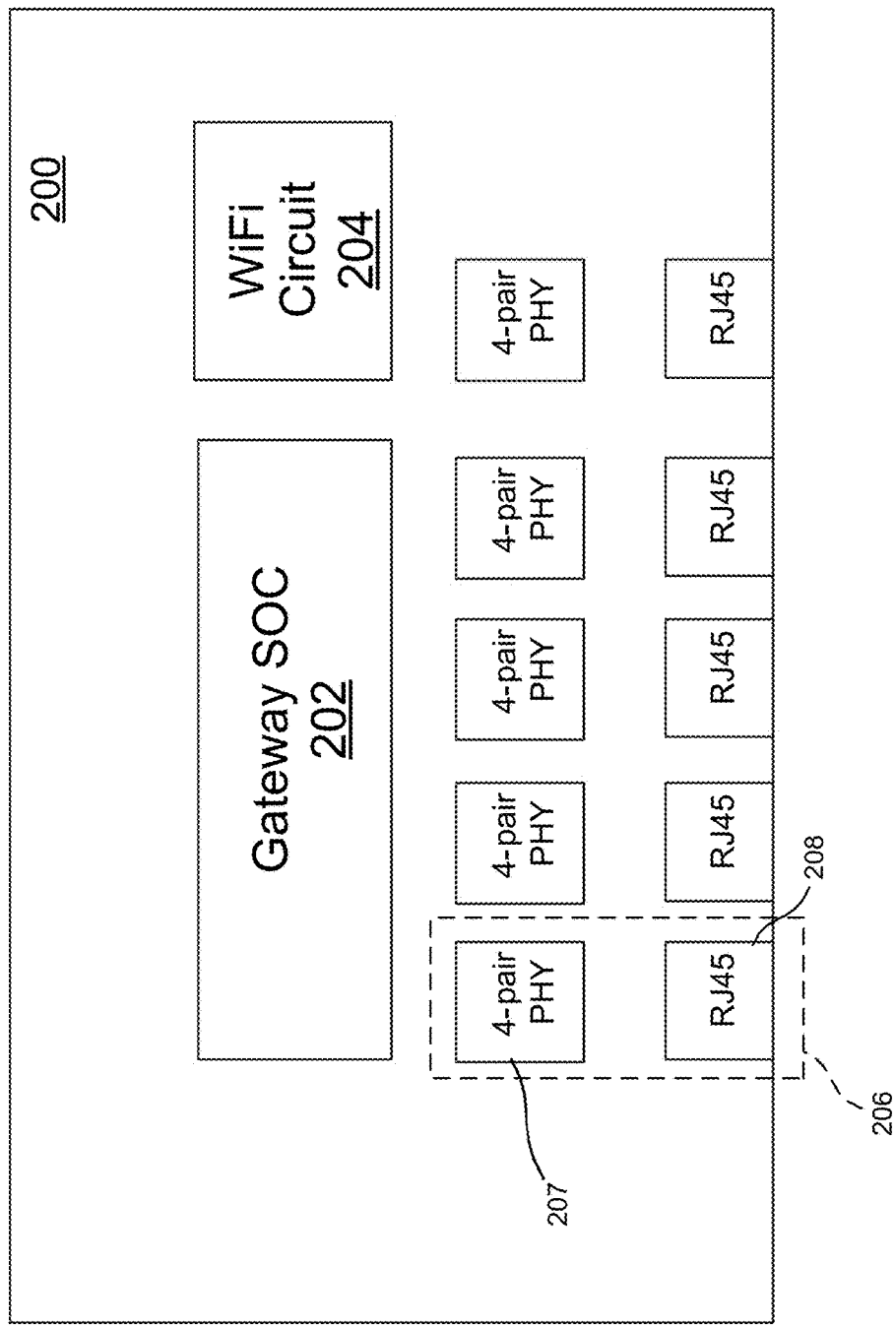
FIG. 2 illustrates one embodiment of a home gateway router for use in the network of FIG. 1.

FIG. 2 illustrates further detail of one embodiment of a home gateway router, generally designated 200, suitable for use in the network of FIG. 1. The gateway router 200 includes a processor 202 that interfaces with a WiFi circuit 204. Multiple Ethernet ports 206 are provided with corresponding 4-pair Ethernet transceiver physical layer circuits (PHYs) 207 coupled to standard RJ45 connectors 208. The 4-pair PHYs provide data transmissions over four twisted-pair wires to provide data rates of, for example, 1 Gbps, 2.5 Gbps or 5 Gbps. Peripheral devices may plug into the RJ45 connectors to obtain Ethernet access, or receive Ethernet wirelessly via the wireless WiFi link associated with the WiFi circuit 204.

Figure 3:
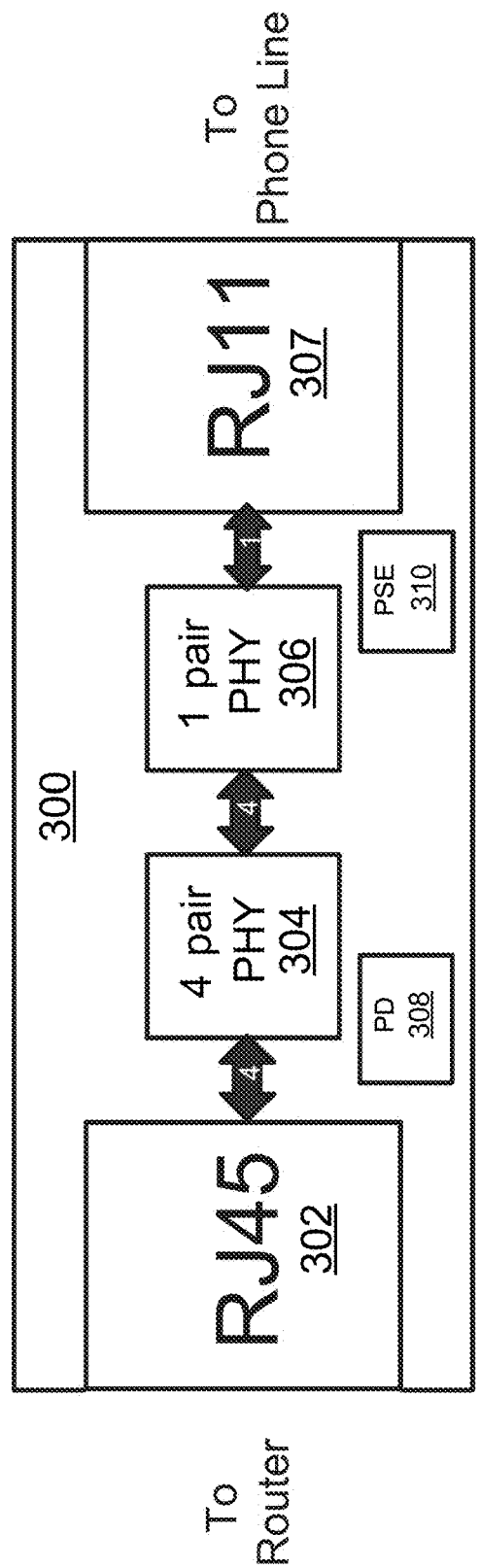
FIG. 3 illustrates one embodiment of an adapter for use in the network of FIG. 1.

Referring now to FIG. 3, to establish a connection between a 4-pair Ethernet link to a single-pair home telephone link, one embodiment of an adapter or Ethernet media converter, generally designated 300, includes an RJ45 connector 302 suitable for mating to one of the corresponding RJ45 connectors 208 of the router 200. The connector 302 interfaces with a first Ethernet transceiver PHY 304 that is configured to operate with four lanes, or pairs of wires. A second Ethernet PHY 306 is disposed adjacent the first PHY 304, and configured to interface with the telephone side of the adapter, with one pair of wires connecting to a standard RJ11 or RJ14 telephone jack 307. The interconnection, or link, between the PHYs 304 and 306 is carried out with four pairs of wires. For one embodiment, Power over Ethernet (PoE) is supported via a powered device (PD) circuit 308 and a power sourcing equipment (PSE) circuit 310.

Figure 4:
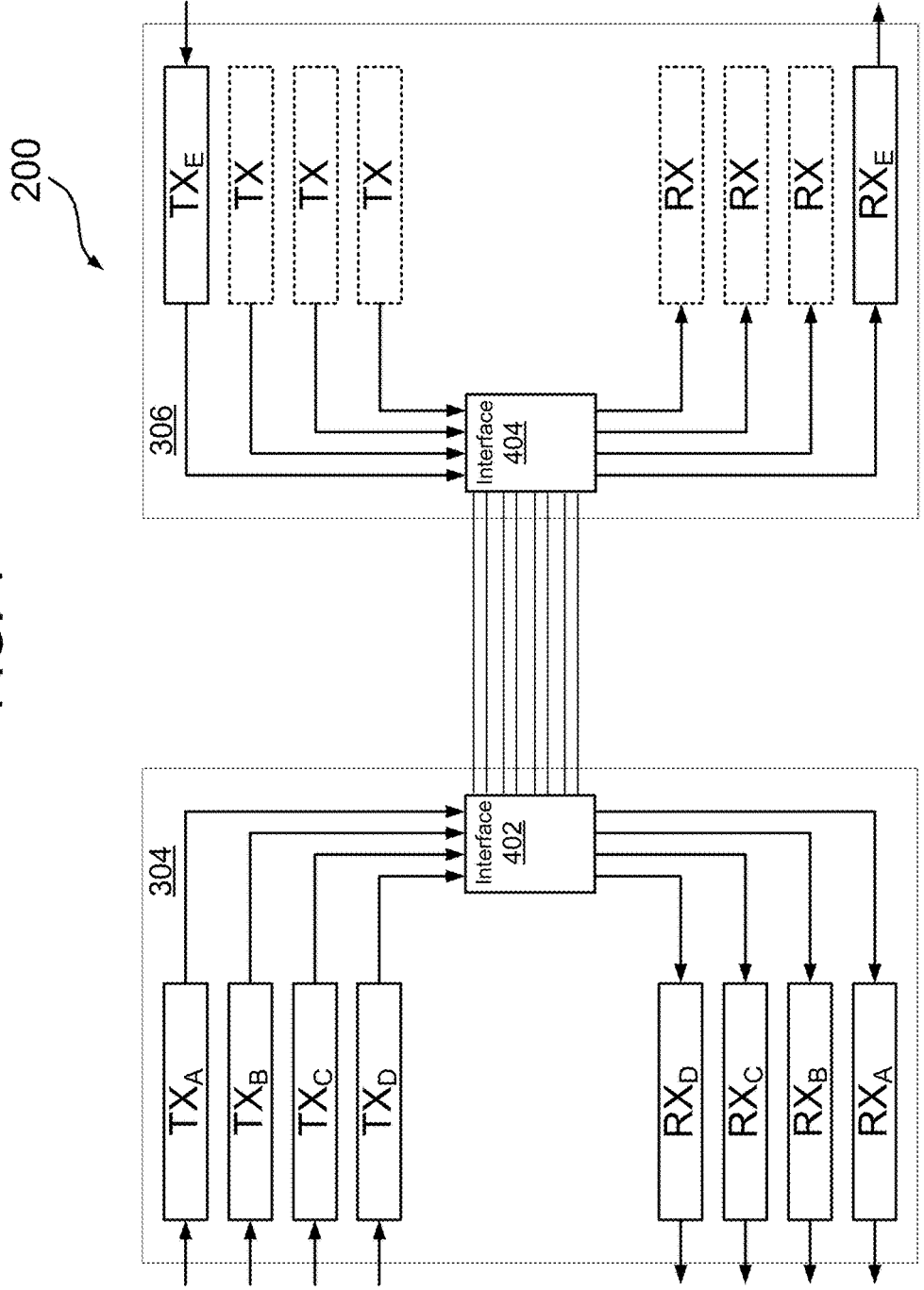
FIG. 4 illustrates one embodiment of a PHY-to-PHY configuration within the adapter of FIG. 3.

FIG. 4 illustrates further detail of a PHY-to-PHY configuration within the adapter 300 of FIG. 3. For one embodiment, the first Ethernet transceiver PHY 304 is capable of high-speed Ethernet data rates and may be compliant with carious high-speed Ethernet standards, such as 10GBASE-T, NBASE-T, and so forth. The PHY employs four sets of transmitters TXA, TXB, TXC, and TXD and four sets of receivers RXA, RXB, RXC and RXD that are coupled to a line interface 402. The second Ethernet transceiver PHY 306 is generally of the same type as the first PHY, but configured to operate with a single pair of transmit and receive circuits TXE and RXE that interface with a single pair of telephone wires. In some implementations, there may be two sets of available phone wires, so that the second PHY may be configured to operate with two pairs.

One embodiment for the pin mappings for interfacing the RJ45 and RJ11/RJ14 connectors to the first and second Ethernet transceiver PHYs 304 and 306 in the Ethernet media converter is shown in FIG. 5. The RJ45 pin-outs correspond to four pairs of wires that are typically identified as Pair A, Pair B, Pair C, and Pair D. The telephone line interface, represented by the RJ11/RJ14 connector, may have or two pairs of wires available, corresponding to Pair A and/or Pair B.

In operation, a user desiring to establish a home network with Ethernet supplied via home telephone line may connect the adapter 300 between a suitable port on the home gateway 102 and a phone jack typically installed flush with the wall. A second network device, such as the second WiFi access point 119 (FIG. 1) may then be then plugged into a second phone jack located in the second room 120 to receive the Ethernet transmissions from the home phone line.

Figure 6:
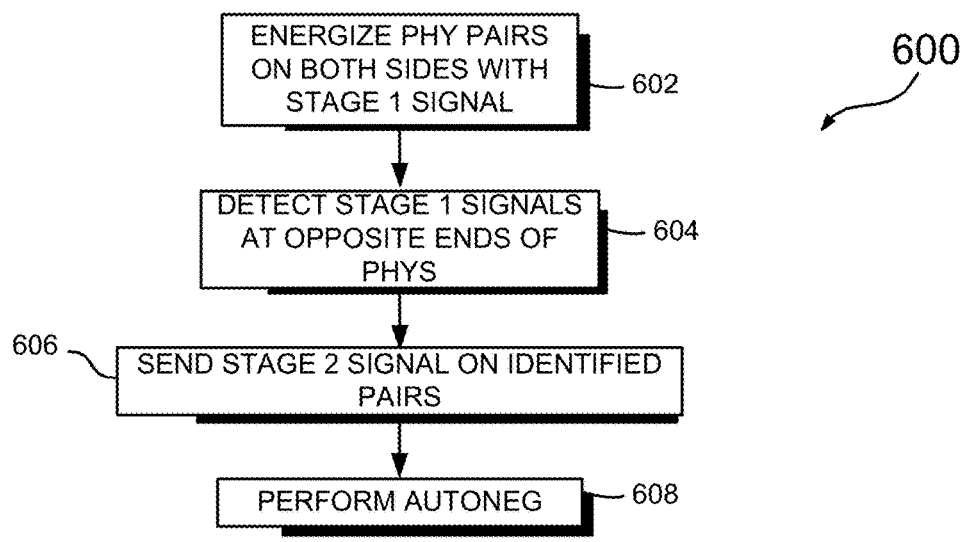
FIG. 6 illustrates a flowchart of steps corresponding to one embodiment of a method of operating the network of FIG. 1.

Prior to operating the system, however, the Ethernet PHYs undergo an autonegotiation and training sequence to establish operating parameters for the link. One of the operating parameters involves identifying to each PHY the numbers of "pairs" of wires that are available for Ethernet-over-phone use. For a home environment, there may be one, two or four pairs of wires possibly available for use in the Ethernet over phone line network. FIG. 6 illustrates a flowchart of steps for a method, generally designated 600, that may be performed in such an autonegotiation sequence.

Referring now to FIG. 6, the autonegotiation process starts with both PHYs having connected "pairs" being energized with a Stage 1 signal, at 602. At opposite ends of the link, the stage 1 signals are detected by each link partner PHY, at 604. A Stage 2 signal is then sent on identified pairs, at 606, followed by a full autonegotiation sequence, at 608. The full autonegotiation sequence may involve each PHY exchanging filter coefficients, power back-off levels, data rates, and so forth to successfully operate the link.

Figure 7:
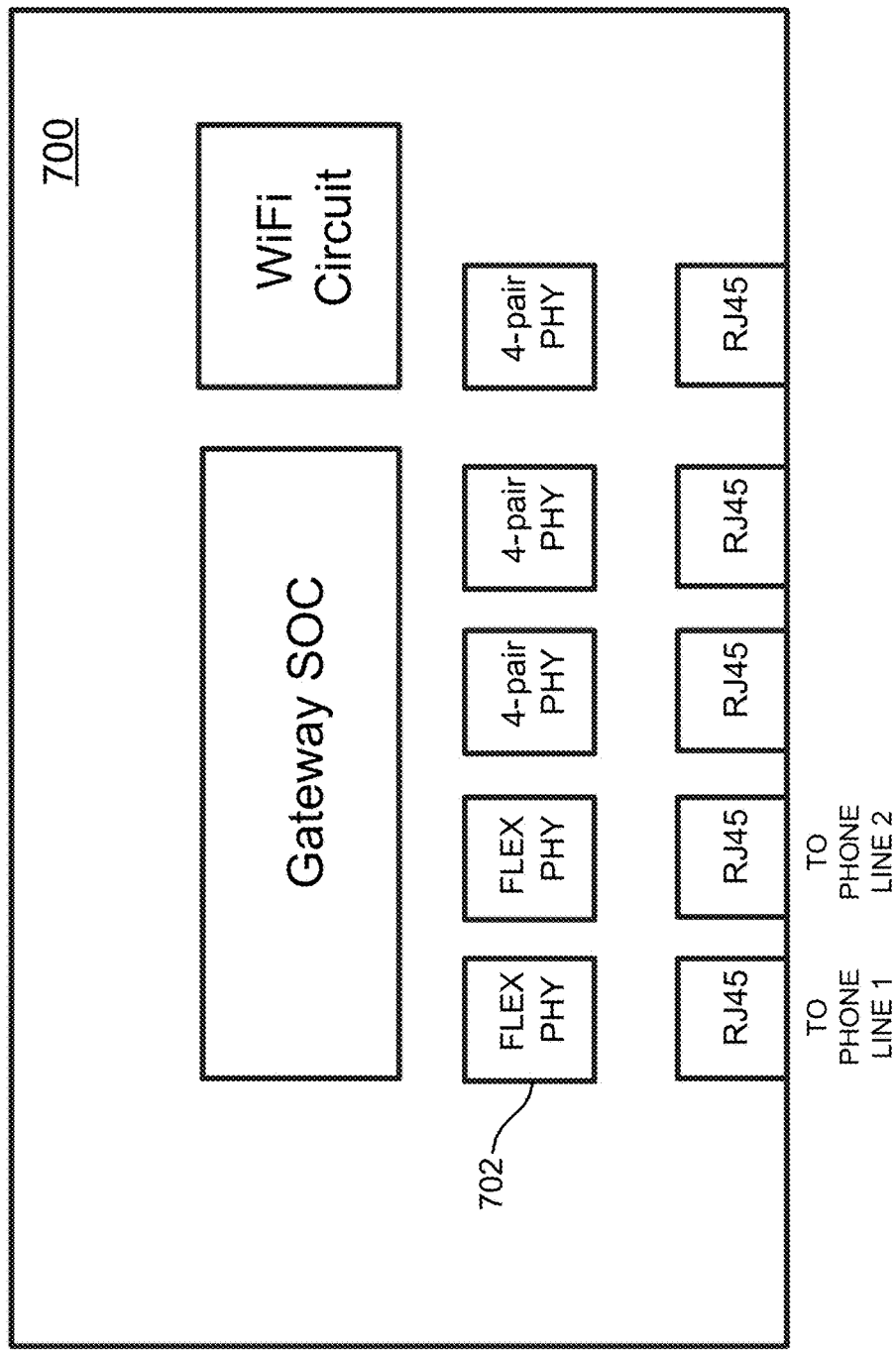
FIG. 7 illustrates a further embodiment of a home gateway router similar to the embodiment shown in FIG. 2.

FIG. 7 illustrates a further embodiment of a gateway router, generally designated 700. The gateway router 700 is similar to the embodiment shown in FIG. 2, but includes one or more "flexible PHY" circuits 702 that are configurable to support a variety of data rates depending on the number of available pairs of wires. For example, if four pairs are available, the flexible PHY may be operate at rates of, for example, 1 Gbps, 2.5 Gbps or 5 Gbps. Should two pairs be available, the flexible PHY may be able to provide data rates at, for example, 2.5 Gbps, 1 Gbps, 100 Mbps and 10 Mbps. Single pair modes may involve data rates at, for example, 1 Gbps and 500 Mbps.

Figure 8:
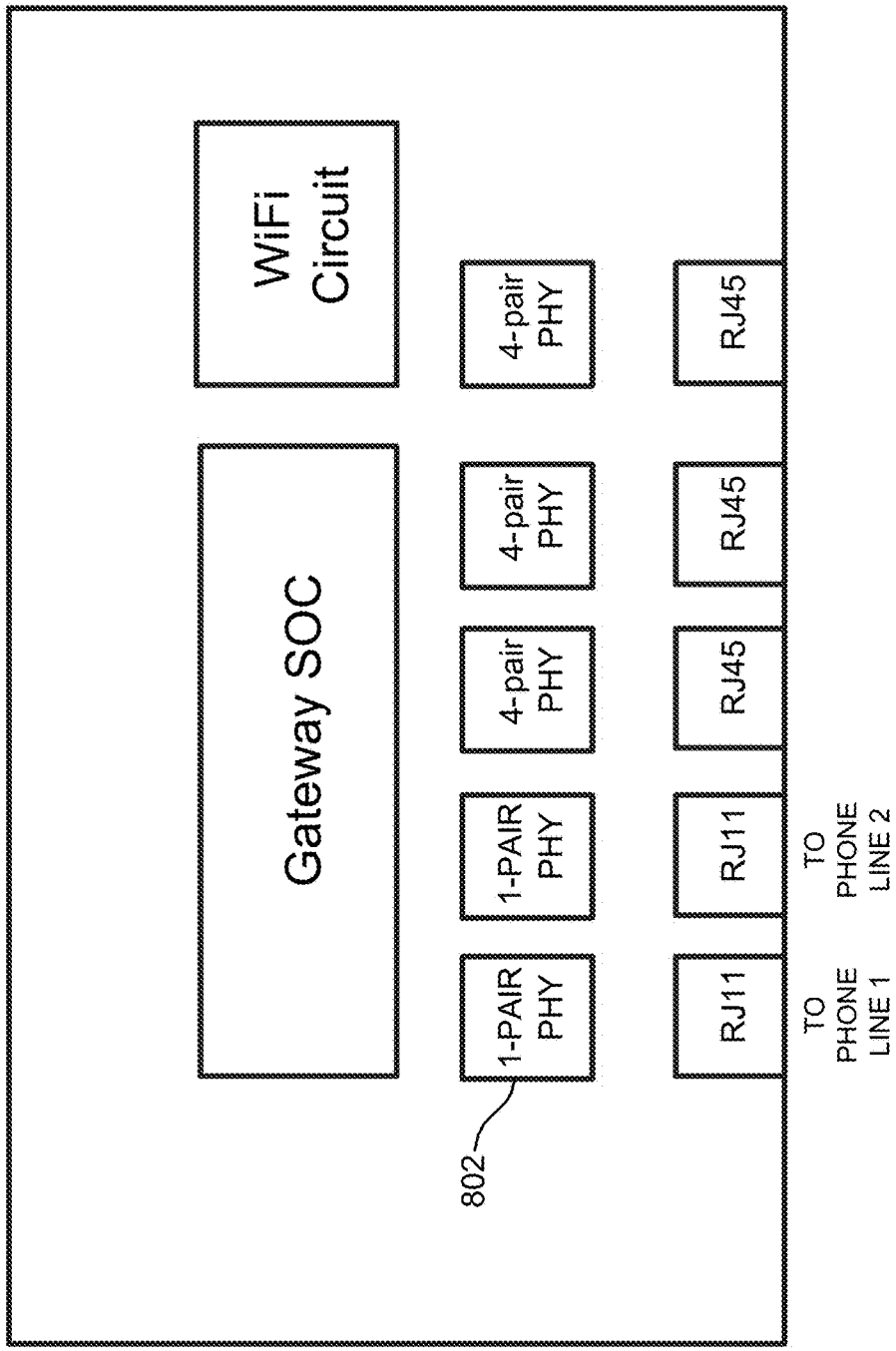
FIG. 8 illustrates one embodiment of a gateway router that employs multiple dedicated single-pair PHY circuits.

In some situations, it may be beneficial to utilize PHYs that are dedicated to a given number of pairs that are to be expected in the network. FIG. 8 illustrates one embodiment of a gateway router that employs multiple dedicated single-pair PHY circuits 802 in multiple ports that are accessible via RJ11 jacks. This architecture eliminates the need for an external media converter or adapter since any conversions or pin mappings are carried out within the router.

Figure 9:
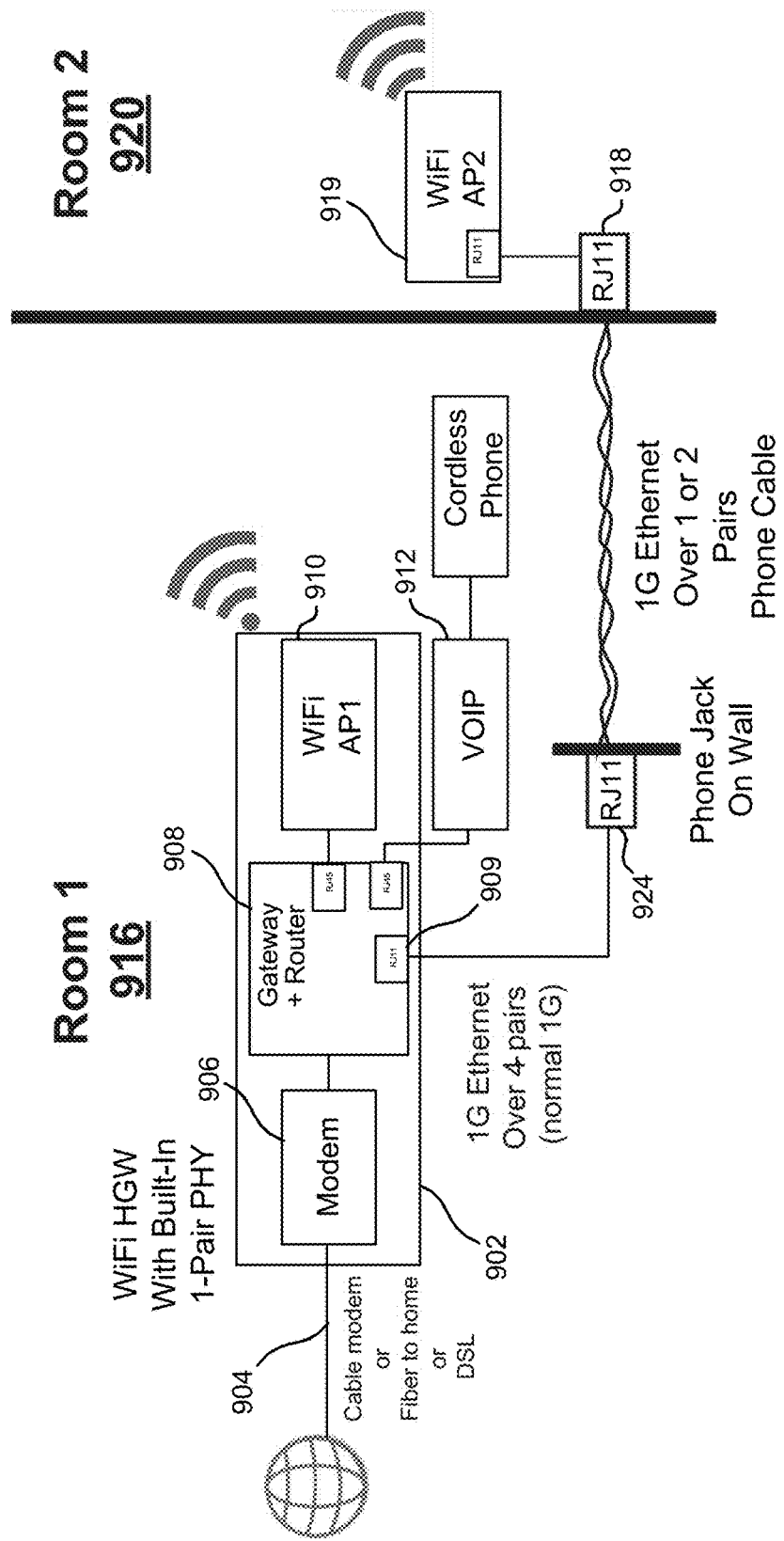
FIG. 9 illustrates a further embodiment of a home network similar to FIG. 1.

FIG. 9 illustrates a further embodiment of a home network, similar to the network shown in FIG. 1, including the gateway router of FIG. 8 that incorporates the built-in dedicated single-pair PHY interface circuits. Similar to the system of FIG. 1, the network includes a home gateway 902 that interfaces with an externally-accessible wide area network (WAN) such as the Internet, via an externally supplied media such as cable, fiber or telephone line 904. The home gateway 902 includes a modem 906 to interface with the external media and a gateway router 908. The gateway router 908 provides a hub function, enabling network access from a centralized access point to a variety of networking data stream interfaces including a WiFi access point 910, and a voice-over-internet protocol (VOIP) interface 912.

The home gateway 902 may generally reside in a first room 916, and provides adequate network access to the room. However, if positioned in a constrained location, the WiFi converage offered by the WiFi access point 910 may be poor. Thus, the embodiment illustrated in FIG. 9 provides a direct Ethernet connection from the gateway router 908 to a port, at 918, located in a second room 920 remote from the first room 916. A second access point 919 may then take advantage of the port 918 to generate an enhanced WiFi coverage zone in the second room 920.

For the embodiment of FIG. 9, the direct Ethernet connection is provided via a connection between a single-pair PHY interface circuit built into the router 908, at 909, and a phone jack, at 924. The phone jack will be connected to other phone jacks in the home via existing telephone wire originally installed in the home. The second access point 919 may receive the Ethernet data by plugging into the second phone jack 918 of the second room 920.

Those skilled in the art will appreciate that the embodiments described above enhance a networks' coverage within a home via the use of existing telephone line. By providing an Ethernet media converter to route Ethernet data over the telephone lines reduced number of pairs, costly new cable installations may be avoided.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An Ethernet networking system comprising:
   a first network device having an interface to receive Ethernet data from a first Ethernet source;
   an Ethernet media converter for coupling the network device to telephone wires, the Ethernet media converter comprising:
      a first Ethernet transceiver PHY integrated circuit (IC) having a first system-side interface for coupling to a first transmission media including multiple pairs of wires and a first line-side interface, and
      a second Ethernet transceiver PHY IC having a second line-side interface connected to the first line-side interface, and a second system-side interface for coupling to the telephone wires.

2. The Ethernet networking system of claim 1, wherein the multiple pairs of wires comprise four pairs of wires, and the telephone wires comprise a single pair of telephone wires.

3. The Ethernet networking system of claim 1, wherein the Ethernet media converter comprises a detachable adapter cable.

4. The Ethernet networking system of claim 1, wherein the Ethernet media converter is disposed in the first network device.

5. The Ethernet networking system of claim 1, wherein a data rate of data transferred between the network device and the telephone wires is configurable based upon the number of telephone wires.

6. The Ethernet networking system of claim 5, wherein the data rate is configured based on identifying the number of telephone wires during an autonegotiation process.

7. The Ethernet networking system of claim 1, wherein the first network device comprises a home gateway.

8. An Ethernet media converter for coupling a network device to telephone wires, the Ethernet media converter comprising:
   a first Ethernet transceiver PHY integrated circuit (IC) having a first system-side interface for coupling to a first transmission media including multiple pairs of wires and a first line-side interface, and
   a second Ethernet transceiver PHY IC having a second line-side interface connected to the first line-side interface, and a second system-side interface for coupling to telephone wires.

9. The Ethernet media converter of claim 8, wherein the multiple pairs of wires comprise four pairs of wires, and the telephone wires comprise a single pair of telephone wires.

10. The Ethernet media converter of claim 8, realized as a detachable adapter cable.

11. The Ethernet media converter of claim 8, wherein a data rate of data transferred between the first PHY and the second PHY is configurable based upon the number of telephone wires.

12. The Ethernet media converter of claim 8, wherein the data rate is configured based on identifying the number of telephone wires during an autonegotiation process.

* * * * *